United States Patent [19]

Schwarz et al.

[11] Patent Number: 4,628,517
[45] Date of Patent: Dec. 9, 1986

[54] DIGITAL RADIO SYSTEM

[75] Inventors: Wolfram Schwarz, Inning; Theodor Schwierz, Aichach; Bernd Sommer, Lochham, all of Fed. Rep. of Germany

[73] Assignee: Siemens Aktiengesellschaft, Berlin and Munich, Fed. Rep. of Germany

[21] Appl. No.: 778,180

[22] Filed: Sep. 23, 1985

Related U.S. Application Data

[63] Continuation of Ser. No. 644,652, Aug. 27, 1984, abandoned, which is a continuation of Ser. No. 363,770, Mar. 31, 1982, abandoned.

[30] Foreign Application Priority Data

May 27, 1981 [DE] Fed. Rep. of Germany ....... 3121146

[51] Int. Cl.$^4$ ........................ H04B 7/02; H04B 15/00
[52] U.S. Cl. ......................................... 375/40; 375/58; 455/52; 455/59; 455/65
[58] Field of Search .................. 455/52, 59, 61, 63, 455/65, 110, 137; 375/40, 51, 57, 58, 100

[56] References Cited

U.S. PATENT DOCUMENTS

| | | | |
|---|---|---|---|
| 3,023,309 | 2/1962 | Foulkes | 455/101 |
| 3,104,393 | 9/1963 | Vogelman | 375/58 |
| 3,114,106 | 12/1963 | McManus | 455/101 |
| 3,384,822 | 5/1968 | Miyagi | 455/65 |
| 3,452,156 | 6/1969 | Engelbrecht | 455/52 |
| 4,035,728 | 7/1977 | Ishikawa et al. | |
| 4,197,501 | 4/1980 | Gammel et al. | 375/88 |
| 4,363,132 | 12/1982 | Collin | 375/40 |

Primary Examiner—Jin F. Ng
Attorney, Agent, or Firm—Hill, Van Santen, Steadman & Simpson

[57] ABSTRACT

Frequency diversity is employed to counter selective fadings as a result of multi-path propagation for troposcatter and short-wave connections for digital useful signals employing frequency modulation. For this purpose, the digital useful signal is supported on a frequency arrangement comprising at least three radio frequencies in that the digital useful signal, together with at least one additional oscillation, and, in fact, an additional fundamental oscillation which determines the frequency of the spacing in radio-frequency frequency arrangement, is fed to the input of a frequency modulator. At the input end, the radio-frequency carriers of the frequency arrangement, which are each modulated with the useful signal, are all converted by coherent mixing into the same frequency level, from which, by way of a combiner, a sum signal is obtained which is the optimum in respect of signal-to-noise ratio.

13 Claims, 5 Drawing Figures

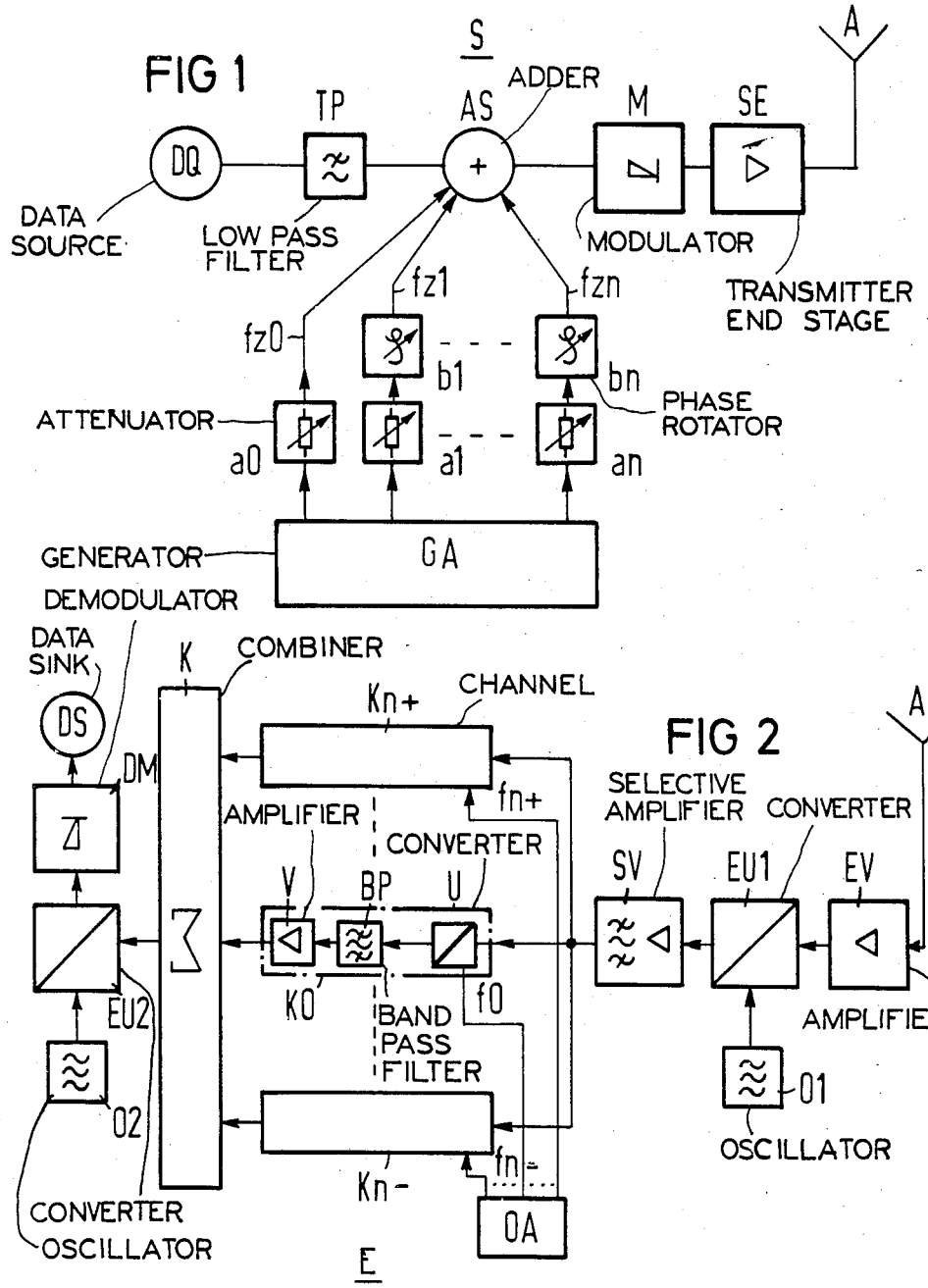

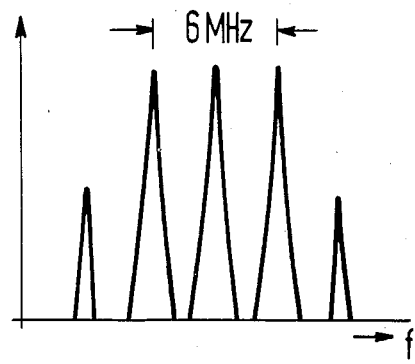
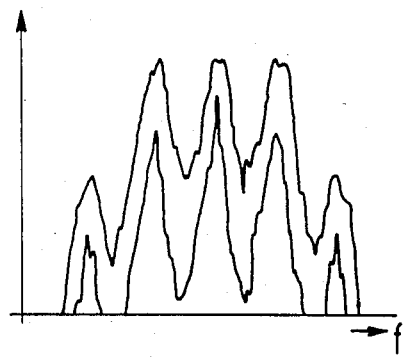
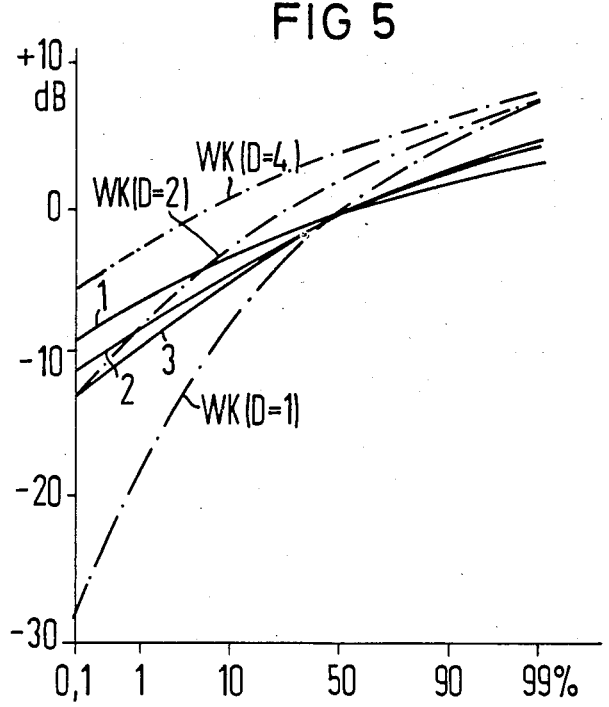

DIGITAL RADIO SYSTEM

This is a continuation of application Ser. No. 644,652, filed Aug. 27, 1984 which is a continuation of Ser. No. 363,770, filed Mar. 31, 1982, both abandoned.

BACKGROUND OF THE INVENTION

1. Field of the Invention

The present invention relates to a digital radio system, in particular for troposcatter and short-wave links, wherein, at the transmitting end, the digital useful signal is impressed in the form of a frequency modulation onto a radio-frequency carrier, and at the receiving end, following suitable demodulation of the received carrier, is available for further processing, and wherein the frequency diversity is employed in order to counter the transmission disturbances which are caused, in particular, by selective fading because of multiple path propagation.

2. Description of the Prior Art

Selective fading, caused by multiple path propagation, in particular, in the case of troposcatter and short-wave lengths, limit the availability of these lengths for the transmission of items of digital communications. As set forth, for example, in the German Pat. No. 26 28 997, corresponding to U.S. Pat. No. 4,197,501, which are fully incorporated herein by this reference, in the transmission of digital frequency-modulated data flows, especially when polydirectional antennae are used, under certain circumstances multiple path propagations lead to serious reception disturbances. Reflections from different directions mean that wave fronts emitted from the transmitting antennae strike the receiving antennae with different transit times. As a result of the vectorial addition of these wave fronts, the antennae base voltage experiences an amplitude response and phase response which are dependent both upon frequency and upon location. Because of the distortions and energy reductions (minima) which this energy distribution produces, for many frequencies and locations is causes a loss of the legibility of digital received signals. When the locating points of a transmitter and a receiver are predetermined, the frequency-dependent energy distribution results in a succession of relatively narrow energy minima and relatively wide energy maxima. The frequency spacing between two consecutive maxima or minima is referred to as the coherency band width of the radio link. In order to safeguard the useful signal transmission it is known, for example through the German allowed and published application No. 25 58 557 corresponding to U.S. Pat. No. 4,035,728, both of which are fully incorporated herein by this reference, to use so-called diversity measures. This consists in an exploitation of the fact that with different radio frequencies the described drop in level does not occur simultaneously (frequency diversity) and, therefore, parallel transmission at two or more frequencies increases the resistance to break downs. In addition to frequency diversity, there also exists so-called space diversity wherein the receiving antennae are constructed at an adequate distance from one another so that, as a result of different transit time conditions, these multiple path effects occur with a considerably lower degree of probability. Because of redundancy, diversity methods involve expenditures which are, in part, substantial.

SUMMARY OF THE INVENTION

The object of the invention is, for a radio system of the type generally set forth above which is equipped for frequency diversity, to provide a special construction which, while maintaining the requisite redundancy, requires only a minimum of technical expense.

Beginning with a radio system of the type set forth above, this object is achieved, according to the present invention, in that in order to support the digital useful signal which is to be transmitted, in a frequency arrangement comprising at least two radio frequencies, at the transmitting and the useful signal, together with at least one additional oscillation, and in fact an additional fundamental oscillation which determines the frequency of the frequency spacing in the radio-frequency arrangement, is fed to the input of a frequency modulator. Moreover, at the receiving end, the radio-frequency carrier, modulated with the useful signal, is converted into an equal frequency position in converters with oscillations, which are coherent to one another, of a conversion oscillator arrangement, and a subsequently combined via a combiner to form a sum signal which exhibits an optimum signal-to-noise ratio.

The invention is based on the fundamental recognition that the support of the digital useful signal which is to be transmitted upon a radio-frequency assignment can be achieved extremely simply in the frequency modulator in cooperation with an additional fundamental oscillation whose frequency determines the assignment spacing. Here, the radio-frequency sum signal possesses an envelope which contains no amplitude modulation components. This signal can be amplified to the required transmitting power in an extremely simple manner, for example in a non-linear class C amplifier without giving rise to distortion effects. Neither is the receiving end intermediate frequency amplifier subject to any requirements relating to linearity following the selection of an assignment sub-signal, as each of the sub-signals represents a pure FM signal.

Particularly favorable conditions are achieved if the radio-frequency, useful-signal-modulated carriers of the frequency assignment schedule are determined taking into account the Bessel functions and their phase are determined for at least approximately equal amplitude, and for this purpose the additional fundamental oscillation, and possibly further additional harmonics, can be adjusted in amplitude, and the additional harmonics can also be adjusted in phase. Here, at least one additional harmonic can be provided to compensate undesired secondaries of the radio-frequency frequency assignment schedule.

As indicated by further considerations on which the invention is based, it is effective that the width of the radio-frequency transmitting spectrum should approximately equal half the occurring coherency bandwidths, as then it is assured that on the occurrence of a selective break in level which occurs as a result of multi-path propagation, only one of the radio-frequency, useful-signal-modulated carriers of the frequency schedule is affected, whereas the remaining, useful-signal-modulated radio-frequency carriers remain largely undisturbed. This occurs because, as already referred to above, the energy distribution over the frequency in the case of multi-path propagation exhibits relatively narrow-band level minima, but relatively wide level maxima.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of the transmitting end of a radio system constructed in accordance with the present invention;

FIG. 2 is a block circuit diagram of the receiving end of a radio system constructed in accordance with the present invention;

FIGS. 3 and 4 are frequency diagrams which explain in detail the operation of the transmitting end block circuit diagram illustrated in FIG. 1; and FIG. 5 is a further diagram illustrating the probability function of the receiving level in dependence upon the availability of a radio-frequency channel, shown in percent.

DESCRIPTION OF THE PREFERRED EMBODIMENTS

Referring to FIG. 1, the transmitting end S is illustrated in a block circuit diagram, according to the present invention, and comprises a data source DQ, which is connected at its output to an adder AS by way of a low pass filter TP. At its other inputs, the adder AS receives an additional fundamental oscillation with a frequency $fz0$ and additional harmonics of the fundamental frequency $fz0$ which are referenced $fz1-fzn$ from a generator GA. The supply lines of the additional fundamental oscillation and the additional harmonics contain adjustable attenuators $a0-an$, whereas the supply lines for the additional harmonics also contain adjustable phase rotators $b1-bn$. The sum signal, composed of the digital useful signal supplied from the data source DQ, the additional fundamental oscillation, and the additional harmonics is fed to the input of a frequency modulator M which comprises a high-frequency oscillator which can be modulated in frequency. The modulator output is followed by a transmitter end stage SE which, preferably, comprises a class C amplifier. At its output end, the transmitter stage SE acts upon an antenna A.

The attenuators $a0-an$ serve to adjust the frequency range which is dependent upon the additional fundamental oscillation and the additional harmonics. The adjustable phase rotators $b1-bn$ additionally serve to adjust the phase of the additional harmonics. The frequency $fz0$ of the additional fundamental oscillation determines the spacing of the modulator output end, radio-frequency frequency schedule. Taken into account the Bessel functions, while describe the frequency modulation and the phases thereof, the modulator output end, radio-frequency frequency schedule can be adjusted to be such that all of the scan lines having a mutual spacing of the frequency $fz0$ possess the same amplitude. Furthermore, one or two of the highest value additional harmonics can be used, by appropriate adjustment of their attenuating elements and phase rotation elements, to a least approximately compensate undesired subsidiary spectral lines of the desired radio-frequency frequency pattern.

The frequency-modulated frequency spectrum which is emitted at the transmitting end and in which each radio-frequency carrier is modulated in frequency with the digital useful information, contains no amplitude modulation components in its envelope so that non-linear amplifiers can be used at the transmitting and receiving ends without any fear of distortion effects.

The frequency-modulated sum signal which is incoming at the antenna A of the block circuit diagram which represents the receiving end E and which is illustrated in FIG. 2 is amplified in a receiving amplifier EV, is subsequently converted into a low frequency position in a first receiving converter EU1 with the aid of an oscillation supplied from an oscillator U1, and is fed to a selective amplifier SV. At the output of the selective amplifier SV, the received, converted, frequency-modulated signal is distributed among a number of channels which correspond to the number of scanned frequencies within the frequency field, and in which channels the frequency-modulated carrier frequencies are each converted to the same intermediate frequency. For this purpose, each of the channels $K_0$, $K_{1+}$ ... $K_{m+}$, $K_{1-}$ ... $K_{n-}$ consists of an input and converter U, which is followed by a band pass filter BP and an amplifier V. The conversion oscillations which are coherent to one another and which possess the frequencies $f_0$, $f_{1+}$ ... $f_{n+}$, $f_{1-}$ ... $f_{n-}$ are supplied by the oscillator arrangement OA. The mutual frequency spacing of the conversion oscillations here is equal to the frequency $fz0$ of the transmitting and additional fundamental oscillation. At their outputs, the channels $K_0$, $K_{1+}$ ... $K_{n+}$, $K_{1-}$ ... $K_{n-}$ are assembled in a combiner K in such a manner that the output sum signal exhibits a optimum (signal-to-noise) ratio. The sum signal formed in this manner, which present at the output of the combiner K, is converted into the base band position in a second converter EU2 comprising a conversion oscillator 02 is subsequently demodulated in a demodulator DM, and the original data useful signal obtained in this manner is fed to a data sink DS.

FIG. 3 illustrates the spectral diagram at the output of the frequency modulator M illustrated in FIG. 1 for an additional fundamental oscillation of the frequency 3 MHz without useful signal and without additional harmonics. As can be seen from the diagram of FIG. 3, a frequency pattern is composed of spectral lines mutually spaced by 3 MHz. By suitable adjustment of the frequency range, for three spectral lines, an identical amplitude is achieved which is followed, on both sides, by a secondary line attenuated by approximately 25 dB. By appropriate adjustment of the frequency range, it would also be possible, apart from the attenuated secondary lines, to produce a frequency pattern comprising two spectral lines spaced by 6 MHz.

The frequency pattern composed of these three radio frequencies of identical amplitude as useful carriers, and which possesses a total width of 6 MHz, corresponds, for example, to approximately half the coherency bandwidths of a troposcatter connection. Therefore, any selective breaks in level can only suppress one of the radio frequency carriers, while the other two remain largely undisturbed.

The signal spectrum illustrated in FIG. 4 corresponds to that illustrated in FIG. 3, with a difference that now the actual useful signal is likewise fed to the frequency modulator via the adder AS of FIG. 1. As can be seen from FIG. 4, each of the radio-frequency carriers, spaced by 3 MHz is modulated in frequency with the useful signal in the same manner.

As has been represented in association with FIGS. 1 and 2, with the aid of additional harmonics it is possible to increase the number of radio-frequency carriers provided in the frequency pattern to five, seven, nine, etc.

In addition, it is possible, with the aid of additional harmonics, to at least approximately suppress undesired secondary lines of the spectrum, such as the frequency spectrum illustrated in FIGS. 3 and 4 possesses.

The distribution of the digital useful signal by means of the special FM modulation in accordance with the present invention between, for example, three equidistant radio-frequency carriers, as illustrated in FIGS. 3 and 4, results in a power reduction of each carrier of approximately 4.8 dB in comparison to the use of a single carrier. Taking into account the low energy content of a spectral line (4.8 dB in the case of three radio-frequency carriers), the diagram of FIG. 5 contains two groups of curves each of which illustrates the likely signal level in dependence upon the channel availability within the limits of 0.1–99%. The dot-dash group of curves WK indicates comparison curves of a conventional radio system operating with and without frequency diversity, whereas the solid line curves referenced 1, 2, 3 illustrate the results achieved by a system constructed in accordance with the present invention.

The probability curve WK with the FDM-diversity-degree degree D=1 indicates the course of the Raleigh channel. The corresponding probability curves WK for a diversity degree D=2 and a diversity degree D=4 illustrate the corresponding improvement in the reception conditions when (two-fold) or (four-fold) frequency diversity is employed. The curves 1, 2 and 3 differ from one another only in respect of the spread band widths which is used. In the case of the curve 1, the spread band width amounts to 19 MHz, in the case of the curve 2 it amounts to 12 MHz, and in the case of the curve 3 it amounts to 6 MHz. As can be seen from FIG. 5, in the present example, with a frequency pattern comprising three carriers and with 99.9% availability of the system, equivalent FDM diversity degrees of D=2 to D=3 can be achieved. The reduction in the fading characteristics in comparison to the Raleigh channel here amounts to 15–20 dB so that in the exemplary embodiment a residual fading of only 3–8 dB is likely. When frequency arrangements comprising more than three radio frequencies are used, the frequency bandwidths of which can also exceed half of a coherency bandwidth of the system, a further improvement can be achieved in the reduction of the fading characteristics in comparison to the Raleigh channel.

Although we have described our invention by reference to particular illustrative embodiments thereof, many changes and modifications of the invention may become apparent to those skilled in the art without departing from the spirit and scope of the invention. We therefore intend to include within a patent warranted hereon all such changes and modifications as may reasonably and properly be included within the scope of our contribution to the art.

We claim:

1. A digital radio system comprising:
a transmitting station operable to provide multi-path propagation including
input means for providing a digital information signal to be transmitted,
transmitter means including a frequency modulator having its own carrier oscillator for producing its own inherent carrier frequency which is frequency modulated by the digital information signal, and
frequency diversity means connecting said input means to said frequency modulator and operable to produce an additional modulation frequency and a plurality of harmonic modulation frequencies of said additional modulation frequency and feed the digital information signal and the additional modulation frequency to said frequency modulator for generating a plurality of carrier frequencies which are frequency modulated by said digital information signal said plurality of carrier frequencies including the frequency modulated inherent carrier frequency and at least two further frequency modulated carrier frequencies having frequency spacings from said inherent carrier frequency which are equal to said additional modulation frequency; and
a receiving station operable to receive multi-path propagation of the modulated carrier frequencies, including
conversion means, including oscillators which are coherent with respect to one another, for converting the modulated carrier frequencies into an equal frequency position, and
a combiner connected to said conversion means and operable to provide a sum signal having an optimum signal-to-noise ratio and counter transmission disturbances which are caused, in particular, by selected fading as a result of multi-path propagation.

2. The digital radio system of claim 1, wherein:
said system has a coherency bandwidth; and
said frequency diversity means includes means for providing a radio-frequency transmitting spectrum width which is equal to approximately half the occurring coherency bandwidth.

3. The digital radio system of claim 1, wherein said input means comprises:
a data source; and
a low pass filter connecting said data source to said frequency diversity means.

4. The digital radio system of claim 1, and further comprising:
a transmitting antenna; and
an amplifier connecting said frequency modulator to said transmitting antenna.

5. The digital radio system of claim 6, wherein: said amplifier is a class C amplifier.

6. The digital radio system of claim 1, and further comprising:
a receiving antenna connected to said conversion means, and
wherein said conversion means comprises:
first conversion means for converting signals received by said receiving antenna to a low frequency position; and
second conversion means connected between said first conversion means for converting the received converted signals to the same intermediate frequency position.

7. The digital radio system of claim 6, wherein said first conversion means comprises:
a receiving amplifier connected to said receiving antenna;
an oscillator;
a converter connected to said receiving amplifier and to said oscillator; and
a selective amplifier connected to said converter for amplifying signals in a selected band.

8. The digital radio system of claim 7, wherein said second conversion means comprises:

a plurality of channels each including
    a converter connected to said selective amplifier and to a respective coherent oscillator,
    a band pass filter connected to said converter, and
    an amplifier connecting said band pass filter to said combiner.

9. The digital radio system of claim 1, and further comprising:
    output means connected to said combiner for providing the digital useful signal in response to said sum signal.

10. The digital radio system of claim 9, wherein said output means comprises:
    conversion means for converting the sum signal into the base band position; and
    a demodulator for demodulating the converted sum signal.

11. The digital radio system of claim 10, and further comprising:
    a data sink connected to said demodulator.

12. The digital radio system of claim 1, wherein undesired secondary lines arise in the transmitted carrier frequencies and wherein, in order to compensate the undesired secondary lines, said frequency diversity means comprises:
    means for providing at least one of said harmonics of said additional carrier frequency to said frequency modulator.

13. A digital radio system comprising:
    a transmitting station operable to provide multi-path propagation, including
        input means for providing a digital information signal to be transmitted,
        transmitter means including frequency modulator connected to said input means and having its own carrier oscillator for producing its own inherent carrier frequency, and frequency diversity means connecting said input means to said frequency modulator and operable to produce an additional modulation frequency and a plurality of harmonic modulation frequencies of said additional modulation frequency and feed the digital information signal and at least the additional modulation frequency to said frequency modulator for generating several carrier frequencies which are frequency modulated by said digital information signal, including the frequency modulated inherent carrier frequency and at least two further frequency modulated carrier frequencies having frequency spacings from said inherent carrier frequency which are equal to said additional modulation frequency, said frequency diversity means comprising frequency generating means including a plurality of frequency outputs for the additional modulation frequency and the harmonic modulation frequencies, an adder connecting said input means to said frequency modulator, a first amplitude adjusting device connecting the output for said additional modulation frequency to said adder, and a plurality of combinations of amplitude adjusting devices and phase adjusting devices respectively connecting the other frequency outputs to said adder for the purpose of taking into account the Bessel functions and the phase thereof for approximately equal amplitude; and
    a receiving station operable to receive a multi-path propagation of the carrier frequencies, including
        conversion means, including oscillators which are coherent with respect to one another, for converting each received radio frequency carrier into an equal frequency position, and
        a combiner connected to said conversion means and operable to provide a sum signal having an optimum signal-to-noise ratio and counter tramsmission disturbances which are caused, in particular, by selected fading as a result of multi-path propagation.

* * * * *